J. R. WILLIAMS.
EDUCATIONAL GAME.
APPLICATION FILED MAY 23, 1921.
1,414,849.
Patented May 2, 1922.
3 SHEETS—SHEET 3.
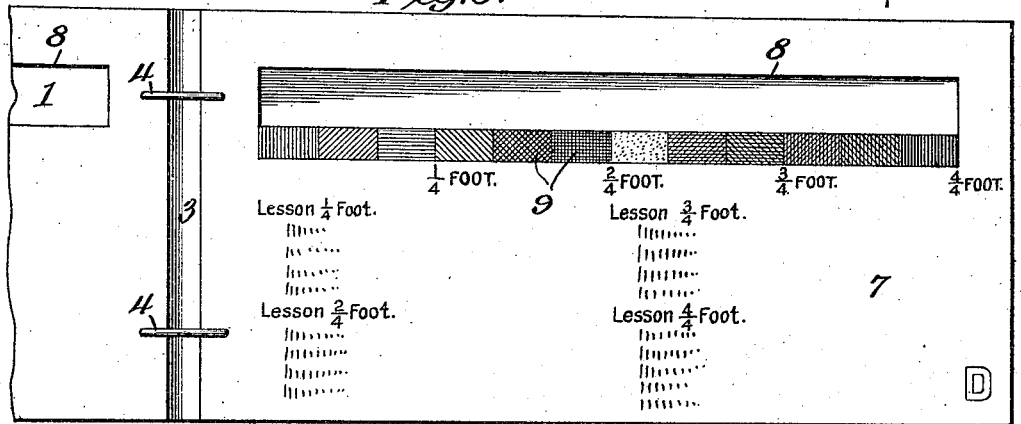
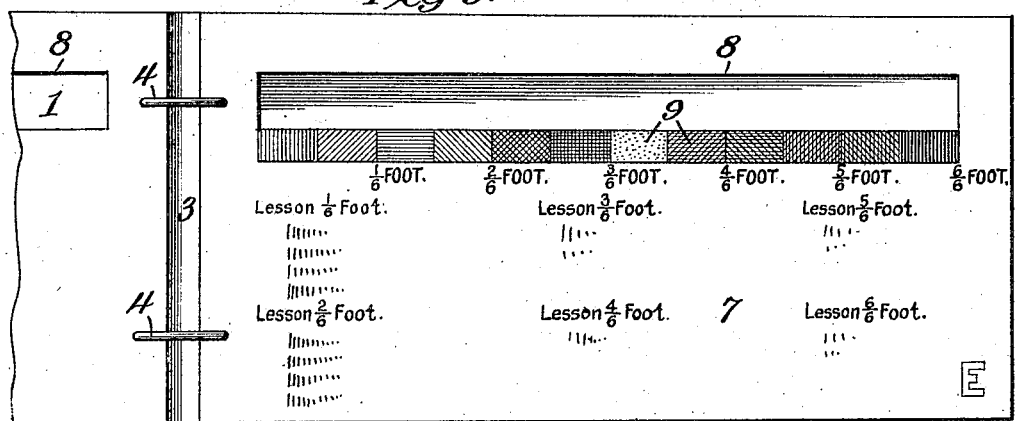
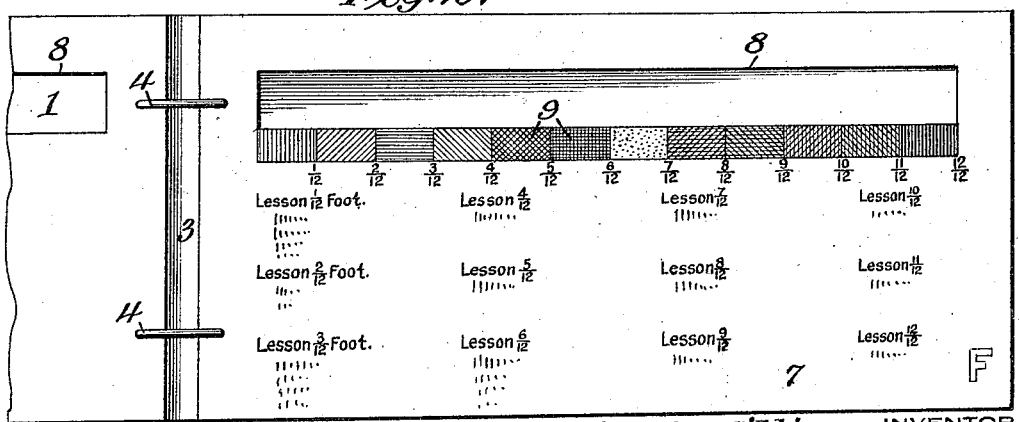
John R. Williams, INVENTOR

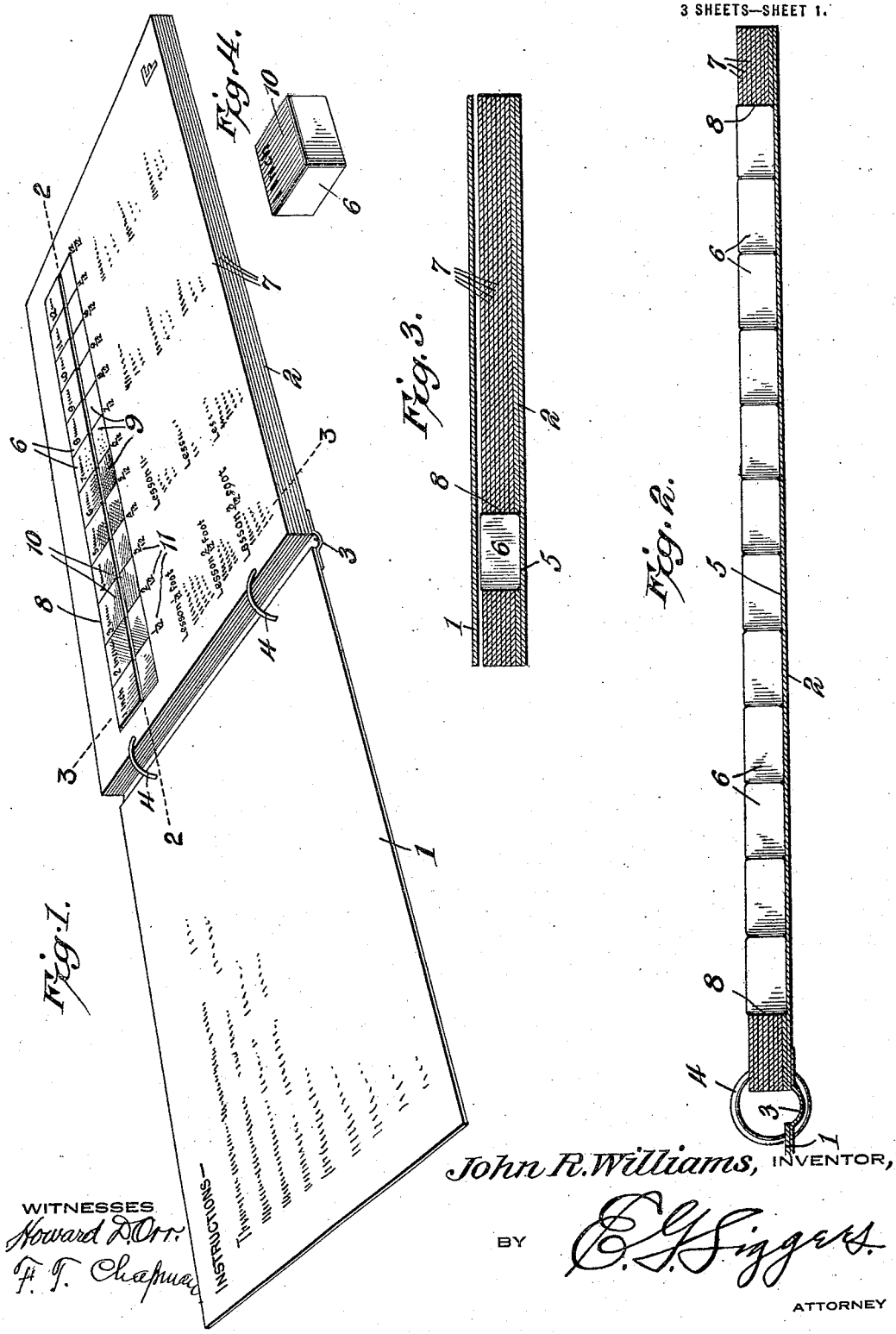

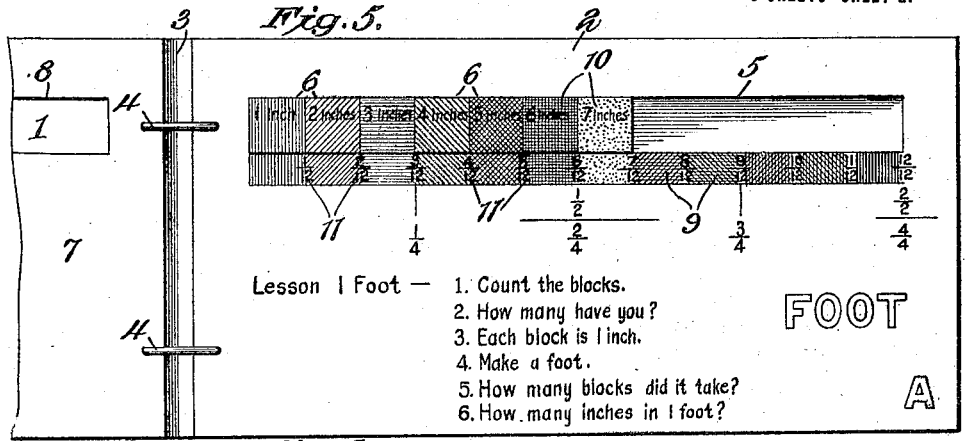
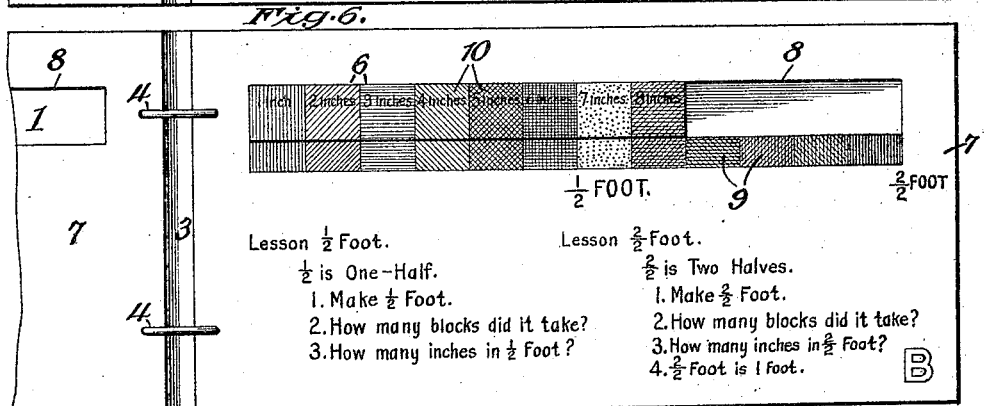
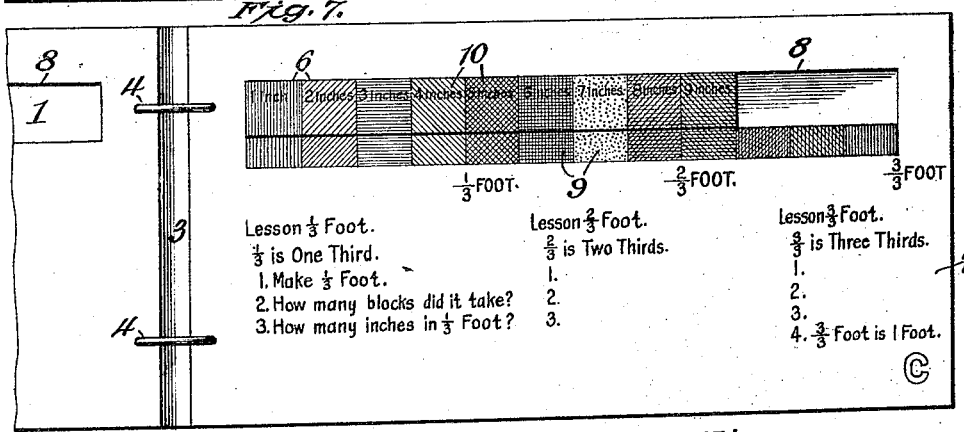

UNITED STATES PATENT OFFICE.

JOHN R. WILLIAMS, OF WALNUTPORT, PENNSYLVANIA.

EDUCATIONAL GAME.

1,414,849.  Specification of Letters Patent.  Patented May 2, 1922.

Application filed May 23, 1921. Serial No. 471,628.

*To all whom it may concern:*

Be it known that I, JOHN RAYMOND WILLIAMS, a citizen of the United States, residing at Walnutport, in the county of Northampton and State of Pennsylvania, have invented a new and useful Educational Game, of which the following is a specification.

This invention has reference to educational games, and its object is to provide for impressing upon the minds of the young elementary educational principles in a manner which shall be interesting to the pupils, and, hence, will be more easily retained than would otherwise be the case.

The invention is directed more particularly to teaching simple problems in mensuration, and comprises an instrumentality requiring a certain amount of handling and arrangement of parts which will be interesting to the pupil, and will enable the pupil to associate, through the aid of the eye, certain parts requiring orderly arrangement, whereby such arrangement may be ascertained wholly by the use of color or by the reading of simple words and sentences, thus acquiring information including mensuration and fractions and simple reasoning.

The basic idea of the invention is to lead the pupil by simple consecutive steps, and aided by the eye, to acquire information of value in other connections, and by operating in the manner of a game, impressing the pupil so that the information becomes fastened upon the memory of the pupil so firmly as to be retained indefinitely.

The invention will be best understood by a consideration of the following detailed description taken in connection with the accompanying drawings forming part of this specification, with the understanding, however, that the invention is not confined to any strict conformity with the showing of the drawings, but may be changed and modified, so long as such changes and modifications mark no material departure from the salient features of the invention, as expressed in the appended claims.

In the drawings,—

Fig. 1 is a perspective view of an instrumentality in book form for teaching simple problems in mensuration.

Fig. 2 is a section on the line 2—2 of Fig. 1, but drawn on a larger scale.

Fig. 3 is a section on the line 3—3 of Fig. 1, but drawn on the scale of Fig. 2.

Fig. 4 is a perspective view of a block employed in the structure of Fig. 1, and drawn on a still larger scale than Figs. 2 and 3.

Figs. 5 to 7, inclusive, are plan views of different leaves of the book-like device of Fig. 1, with different numbers of removable blocks in place.

Figs. 8, 9 and 10 are views similar to Figs. 5 to 7, but omitting all the blocks and showing successive leaves making up the book.

Referring to the drawings, there is shown in Fig. 1, a front cover 1 and a back cover 2 connected by a hinged section 3, and by ring-like hinges 4, so that the cover 1 may be opened away from the body of the book upon the hinges 4, as shown in Fig. 1, or the cover 1 may be folded over onto the closed body of the book to shield and protect it, the hinges being omitted in Fig. 3 and shown in the other views.

The cover 1 may be conveniently made of sufficiently heavy card-board and the back 2 may also be made of card-board, but of double thickness, permitting a slot or recess 5 of suitable width and length to be produced in the back 2 and sunken through the upper layer of the back 2. A single thickness of suitable cardboard is sufficient to provide the slot 5, so as to snugly hold a series of blocks 6 of wood or composition, said blocks being preferably square in outline and purposely measuring about an inch on each side, so as to define a square inch in superficial area. In this way, each block 6 will define a square inch, the thickness not being material, except to provide for bulk and easy handling.

Attached to the front and back of the device by the hinges 4 is a series of leaves 7 of like area to the back 2 and cover 1 and made of card-board or heavy paper or other material of sufficient rigidity for the purpose. Each of the leaves 7 is provided with a slot 8 to pass the blocks 6 so that the faces of the leaves may be exposed successively, as shown in Figs. 5 to 10, inclusive. Bordering one edge of the slots 8 in the leaves 7 is a series of imprints 9, each representing a different appearance from the others, as, for instance, a different color, and the blocks 6 each have the exposed surface 10 of a different color corresponding to the imprints 9. For instance, the first imprint 9 to the left may be red, the second brown, the third blue, the fourth green, and so on throughout the entire series of imprints 9 and block surfaces 10, with each imprint 9 and block surface 10 corresponding. The blocks 10 may be removed at will, but the imprints 9 are fixed on each sheet or leaf 7 and remain constant throughout the series of leaves.

The several blocks 6, in the particular illustration in the drawing, represent inches and are numbered consecutively, as, 1 inch, 2 inches, 3 inches, etc., up to 12 inches so that the entire length of blocks, when in position, represents one foot.

The rear cover is designated by the letter, A, for distinction. The first leaf next to the rear cover is designated by the letter, B. The third leaf is designated by the letter, C, and so on, up to the letter, F, which, in the particular arrangement illustrated constitutes the topmost leaf, these letters being imprinted on the several leaves, and are intended to form a permanent part of the device.

The rear cover 2, designated by the letter A, has imprints 9 thereon, with fractional designations 11, representing inches in twelfths of a foot arranged at the junctions of the imprints 9, and below the imprints 9 and adjacent to them are other fractions indicating the larger divisions of a foot, such as 1/4, 1/2 or 2/4, 3/4, and 2/2 or 4/4.

To guide both the teacher and pupil, there is imprinted upon the face of the back 2, designated by the letter, A, a lesson called "Lesson—1 foot," and in conjunction with the printed matter, certain statements and questions are printed, as, for instance,—
1. Count the blocks.
2. How many have you?
3. Each block is one inch.
4. Make a foot.
5. How many blocks did it take?
6. How many inches in one foot.

In addition to the imprints on the sheet, A, may appear the word "Foot".

The imprints on leaf, B, relate to the large fractions of a foot, namely, 1/2 foot and 2/2 foot. The lessons imprinted on sheet, B relate to the half foot and to the two halves of a foot, with certain questions relating to them.

On leaf, C, thirds of a foot are taken up for consideration, and the lessons are printed similarly to those on the preceeding sheets or leaves. In like manner, leaves, or sheets, D, E and F, relate to quarters, sixths and twelfths of a foot respectively with lessons directed thereto, and all based upon the same general considerations, so that ultimately the problems require an extended knowledge of the characteristics set forth on the device, with the acquisition of the knowledge made entertaining and obtained easily with the aid of the educational game of the invention.

Because the blocks 6 are removable and replaceable, and the replacing of the blocks is aided by the colored guides, the pupil is enabled to learn by unconscious repetition until, without realizing it the pupil has acquired an extended knowledge, not only valuable in itself, but helpful in the acquisition of further knowledge.

What is claimed is:

1. An educational device, comprising a group of leaves having matching slots, a back and a cover, with the back formed with an elongated recess, a row of unit members normally held end to end in the recess and projecting through matching slots in the several leaves to be accessible to the user irrespective of whether or not all the leaves be closed at one time, and each leaf having located on the margin of the slot an imprint for aiding the pupil in properly placing the blocks in the proper order in the slot.

2. An educational device, comprising a body member, with an elongated recess therein, a cover member hinged to the first named member whereby the two members may be moved to the open position or closed together, a pile of leaves attached to the hinges for movement between the two members, and a group of associated blocks each of which represents an object of definite size, and the blocks being adapted to fit snugly in the recess.

3. An educational device, comprising a body member with an elongated recess therein, a cover member hinged to the body member whereby the cover member may be moved to an open position or closed toward the body member, a pile of leaves attached to the hinges, and each leaf being provided with an elongated slot corresponding to the recess in the body member, and a group of associated blocks each representing an object of a definite size and adapted to fit snugly in the recess in the body member, and in the slots in the leaves, the blocks having individualizing surface indicia and each leaf having surface indicia bordering one edge of the slot through the leaf.

4. An educational device, comprising a body member and a cover member, a pile of intermediate leaves, hinges connecting the leaves and body and cover members, and the body member being provided with an elongated recess, with the leaves having slots through them matching the recess in the body member, and removable blocks lodged in the recess and slots and of a thickness to project through the leaves, said body member and leaves having differently colored imprints bordering the slots and the blocks being colored in conformity with the imprints for guiding the location of the blocks in the body member and in the slots in the leaves.

5. An educational device, comprising a body member with an elongated recess therein, a series of blocks proportioned to snugly lodge in the recess in end to end engagement to define a predetermined length, a pile of leaves, each having an elongated slot therethrough corresponding to the recess in the body member and matching to pass the blocks, with the pile of leaves of a depth corresponding to the projection of the blocks from the body member, and said body member and pile of leaves having indicia to guide the user in placing the blocks in proper relation in the slots in the leaves and the recess in the body member.

6. An educational device, comprising a body member with an elongated recess therein, a series of blocks proportioned to snugly lodge in the recess in end to end engagement to define a predetermined length, a pile of leaves, each having an elongated slot therethrough corresponding to the recess in the body member and matching to pass the blocks, with the pile of leaves of a depth corresponding to the projection of the blocks from the body member, and said body member and pile of leaves having indicia to guide the user in placing the blocks in proper relation in the slots in the leaves and the recess in the body member, the device also including a cover member and hinges for the cover member and leaves, whereby to provide for opening and closing the device with different numbers of leaves resting on the body member.

7. An educational device, comprising a body member, a cover member, a pile of leaves, and a series of blocks each of a predetermined size, the body member having means for holding the blocks, in a row, the leaves being arranged to pass the blocks when located in a row, and the body member and leaves each having imprints, and the blocks being characteristically indicated in conformity with the imprints, to guide the user in a designed orderly arrangement of the blocks.

8. An educational device, comprising a body member, a cover member, a pile of leaves, and a series of blocks each of a predetermined size, the body member having means for holding the blocks in a row, the leaves being arranged to pass the blocks when located in a row, and the body member and leaves each having imprints, and the blocks being characteristically indicated in conformity with the imprints to guide the user in a designed orderly arrangement of the blocks, and the leaves and co-ordinated parts of the device having imprints thereon to impart useful information.

In testimony, that I claim the foregoing as my own, I have hereto affixed my signature.

JOHN R. WILLIAMS.